Dec. 23, 1947.  H. H. JOHNSON  2,433,223
TACK HAMMER
Filed Jan. 31, 1945  4 Sheets-Sheet 1
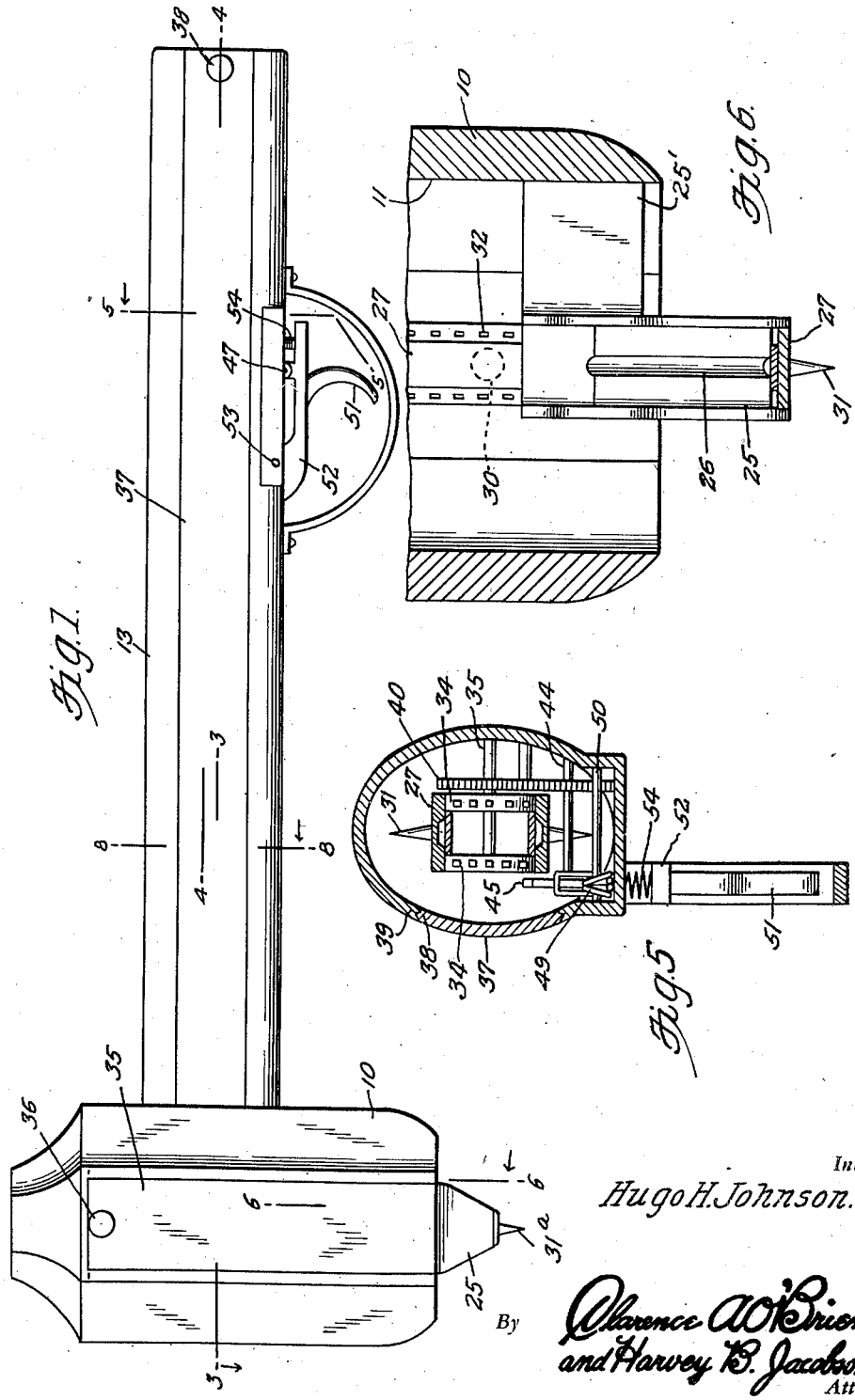
Inventor
Hugo H. Johnson.
By Clarence A. O'Brien
and Harvey B. Jacobson
Attorneys

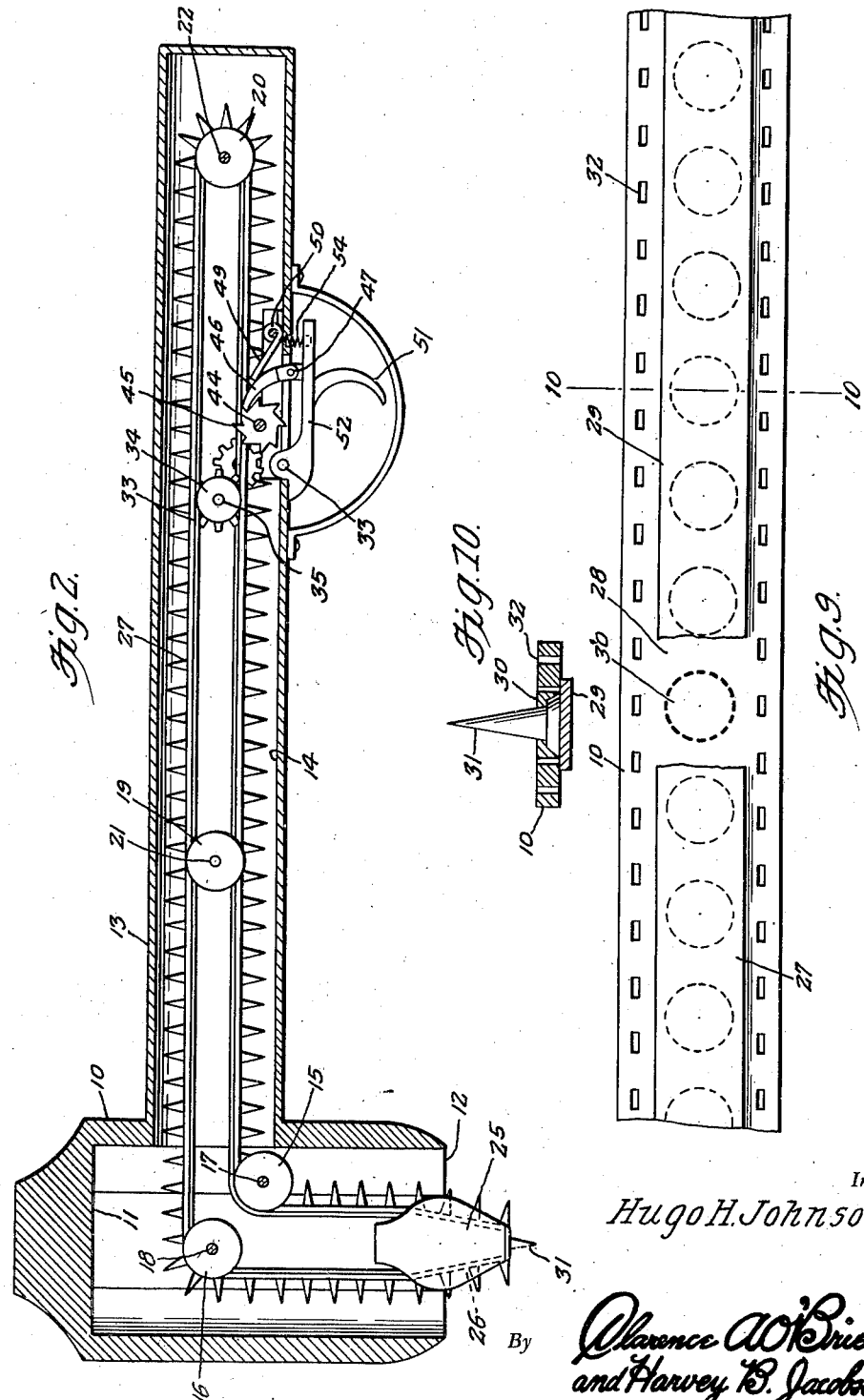

Dec. 23, 1947.   H. H. JOHNSON   2,433,223
TACK HAMMER
Filed Jan. 31, 1945   4 Sheets-Sheet 3
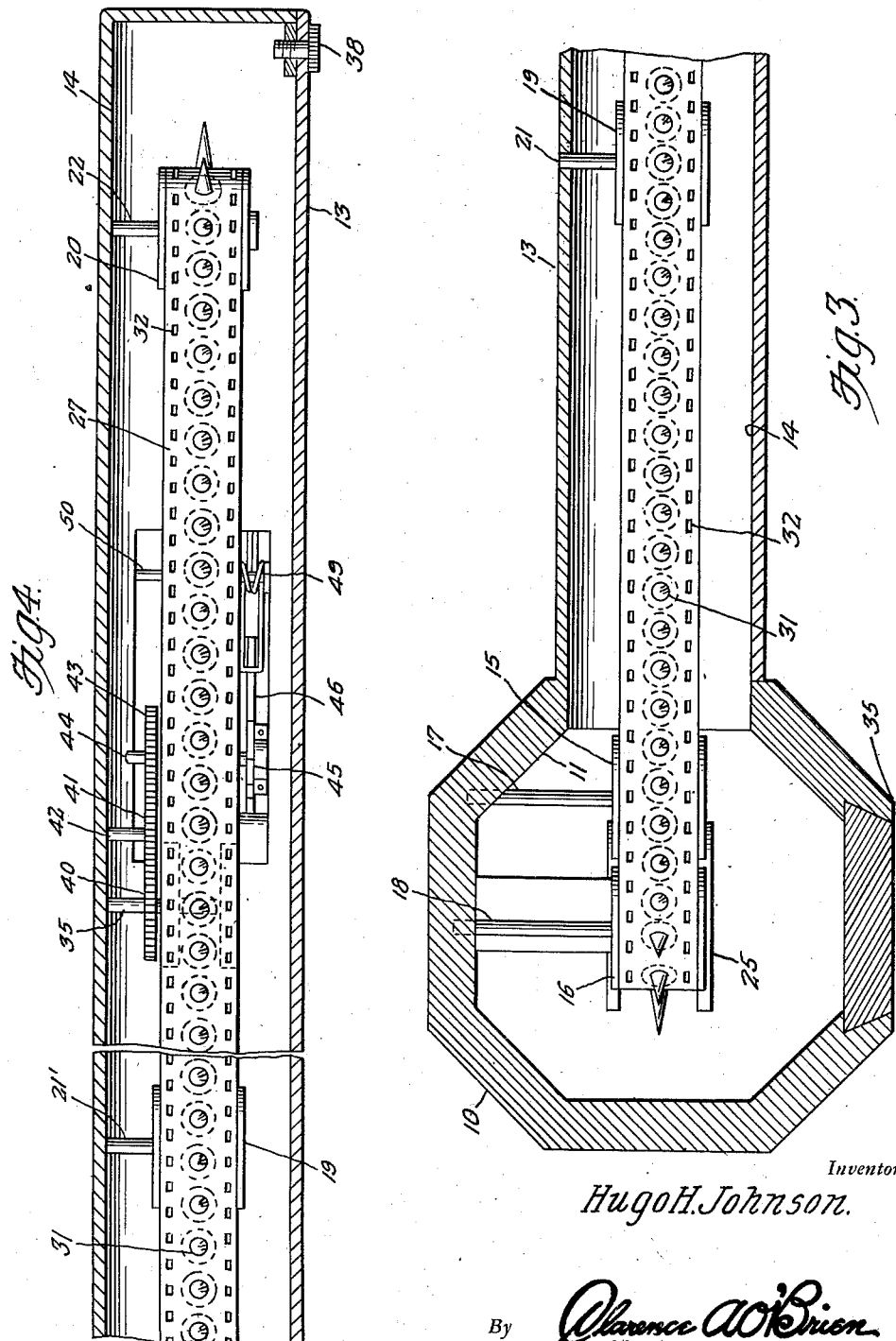
Inventor
Hugo H. Johnson.
By Clarence A. O'Brien
and Harvey B. Jacobson
Attorneys Dec. 23, 1947.                 H. H. JOHNSON                 2,433,223
                                TACK HAMMER
                            Filed Jan. 31, 1945              4 Sheets-Sheet 4
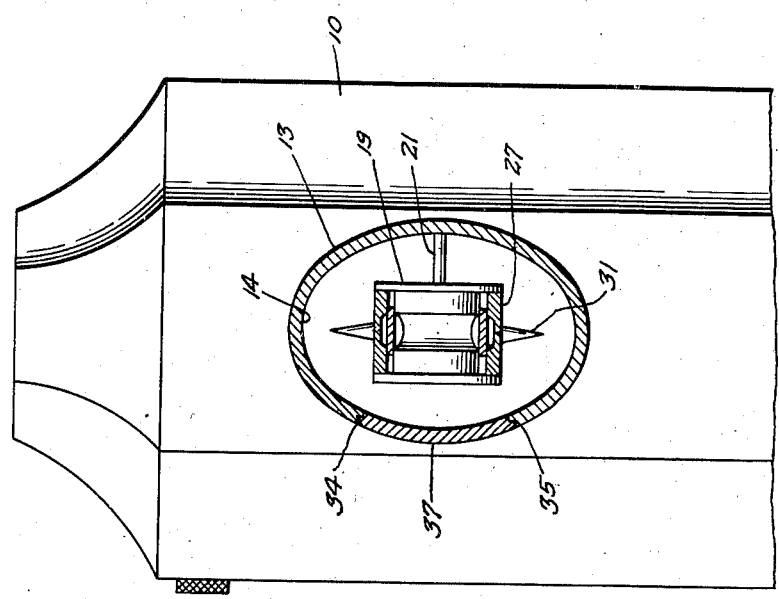
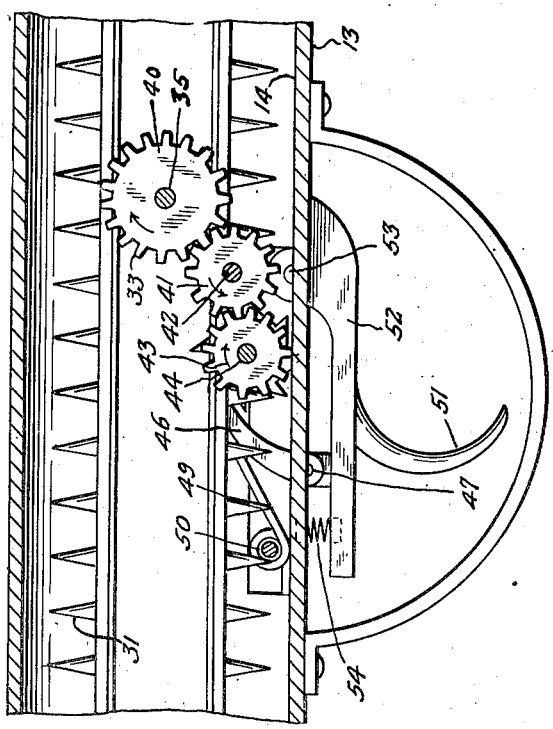
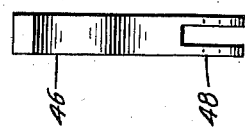
Inventor
*Hugo H. Johnson.*
By *Clarence A. O'Brien
and Harvey B. Jacobson*
Attorneys Patented Dec. 23, 1947

2,433,223

UNITED STATES PATENT OFFICE 2,433,223

TACK HAMMER

Hugo H. Johnson, Ely, Minn.

Application January 31, 1945, Serial No. 575,500

5 Claims. (Cl. 1—45)

This invention relates to an automatic tack hammer, more particularly to such a device adapted to contain within itself a supply of tacks adapted to be successively positioned for hammering.

A primary object of this invention is the provision of an improved automatic tack hammer, having a head and an elongated handle, and an endless belt positioned within the handle and head having a plurality of tacks positioned thereon and so arranged and positioned as to be successively aligned with the head for hammering into a desired object.

An additional object of the invention is the provision of such a device provided with mechanism whereby the endless belt containing the tacks may be moved forwardly a predetermined distance to position a tack in place on the head, as by means of a trigger.

An additional object of the invention is the provision of such a trigger mechanism which will be substantially automatic and adapted to move the belt a predetermined distance at each pull of the trigger.

A further object of the invention is the provision of such a device wherein the endless belt containing tacks may be readily replaced, as desired.

Still another object of the invention is the provision of such a device which will be sturdy and durable in construction, reliable and efficient in operation, and relatively simple and inexpensive to manufacture and assemble.

Other objects reside in the combinations of elements, arrangements of parts, and features of construction, all as will be more fully pointed out hereinafter and shown in the accompanying drawing, wherein there is disclosed a preferred embodiment of this inventive concept.

In the drawings:

Figure 1 is a side elevational view of one form of the hammer embodying features of this inventive concept, Figure 2 is a longitudinal vertical sectional view taken substantially along the center line of Figure 1, Figure 3 is an enlarged sectional view taken substantially along the line 3—3 of Figure 1, Figure 4 is an enlarged horizontal sectional view taken substantially along the line 4—4 of Figure 1 and comprising a continuation of Figure 3, Figure 5 is a sectional view taken substantially along the line 5—5 of Figure 1 as viewed in the direction indicated by the arrows, Figure 6 is an enlarged sectional view taken substantially along the line 6—6 of Figure 1 as viewed in the direction indicated by the arrows, Figure 7 is an enlarged sectional view disclosing details of the operation of the trigger-actuating mechanism, Figure 8 is an enlarged sectional view taken substantially along the line 8—8 of Figure 1 as viewed in the direction indicated by the arrows, Figure 9 is an enlarged view, partially in plan and partially in elevation, showing the endless belt containing the tacks, Figure 10 is a sectional view taken substantially along the line 10—10 of Figure 9, and Figure 11 is an elevational view of a constructional detail of the ratchet dog.

Similar reference characters refer to similar parts throughout the several views of the drawings.

Having reference now to the drawings, the device of the instant invention comprises a weighted head 10, provided with an interior recess 11 open at its lower face as at 12, and a handle 13 comprising a hollow tubular member having an interior recess 14 in communication with the recess 11.

Suitably positioned within the recess 11 is a pair of rollers 15 and 16, rotatably mounted on axles 17 and 18 journaled in the side of the head 10, and positioned within the tubular handle 13 are additional rollers 19 and 20, mounted on axles 21 and 22 extending from the side wall of the handle member 13.

Positioned in the open end 12 of the recess 11 is a weighted head member 25, having vertically extending grooves 26 in the opposite side walls thereof. Head member 25 is secured to member 10 by means of plate 25' as shown in Figure 6. An endless belt 27, extends about the head 25, over the exterior of the roller 16, and the interior of the roller 15, and about the rollers 19 and 20.

The belt 27 is, as best shown in Figures 9 and 10, comprised of inner and outer layers 28 and 29, the inner layer being provided with a plurality of spaced circular portions 30, scored to provide a seat for tacks 31. The side walls of the belt 27 are provided with a plurality of spaced apertures 32 extending therethrough, adapted to be engaged by the teeth 33 of oppositely spaced cog wheels 34 mounted on an axle 35, adapted in a manner to be more fully described hereinafter, to move the endless belt. Access to the recess 11 is provided by a sliding panel 35 provided with a finger grip 36, vertically slidable in the head 10, in such manner as to open the side thereof, and access to the interior of the handle portion 13 is correspondingly supplied by a horizontally slidable panel 37, the extremities of which are flanged as at 38, and slidable in grooves 39 (see Figure 5).

Mounted on the opposite extremity of the axle 35, which carries the sprockets 34, and extending beyond the side of the belt 27, is a gear 40, adapted to be rotated by a second gear 41 mounted on the stub axle 42 (see Figure 4), which in turn is actuated by a third gear 43 mounted on a stub axle 44. The axle 44 also carries a ratchet 45, adapted to be engaged by a dog 46, pivotally mounted as at 47, the lower extremity being bifurcated to form bifurcations 48, and urged toward the ratchet 45 as by means of a spring 49 mounted on a transverse shaft 50.

A trigger member 51, comprises a portion of a lever member 52 pivotally mounted as on a pivot 53 in a suitable slot in the lower portion of the handle member 13, the member 53 being biased outwardly from the handle as by a compression spring 54 positioned between the free extremity thereof and the wall of the handle.

From the foregoing, the operation of the device should now be readily understandable.

A belt 27 loaded with tacks 31 is first positioned over the rollers of the belt described, after removal of the side panels 35 and 38, it being noted that the various axles 17, 18, 21, and 22 extend only from one side wall of their associated head or handle. The device is then adjusted until one of the tacks 31a is positioned directly on the face of the head 25, and the panels closed. The device may then be utilized as a hammer, the tack being appropriately positioned. When the tack is completely driven in, the device is lifted and the score lines 30 of the belt adjacent the tack 31a are torn out, leaving the tack intact in its proper hammered position. A pull on the trigger 51 then causes the dog or pawl 46 to move the ratchet 45 one tooth forwardly, rotating, through the system of gearing above described, the sprockets 34, which, by means of the teeth 33, moves the endless belt 27 in such manner as to position the next adjacent tack on the head 25 of the hammer. When the trigger is released, the spring member 49 biases the dog toward the ratchet to hold the same against further rotation or movement, and the above described operation is repeated.

From the foregoing, it will now be seen that there is herein provided an improved automatic hammer, accomplishing all of the objects of this invention, and others including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In an automatic hammer, a hollow head portion having an open end, a hammer head having guide grooves therein centrally positioned in said open end, a hollow handle communicating with said hollow head, a replaceable endless belt movably mounted in said handle and head portion, and extending through said grooves over the operating face of said hammer head, and tacks carried by said belt extending therethrough.

2. In an automatic hammer, a hollow head portion having an open end, a hammer head having guide grooves therein centrally positioned in said open end, a hollow handle communicating with said hollow head, a replaceable endless belt movably mounted in said handle and head portion, and extending through said grooves over the operating face of said hammer head, tacks carried by said belt extending therethrough, said belt being mounted on rollers, and means for moving said belt.

3. In an automatic hammer, a hollow head portion having an open end, a hammer head having guide grooves therein centrally positioned in said open end, a hollow handle communicating with said hollow head, a replaceable endless belt movably mounted in said handle and head portion and extending through said grooves over the operating face of said hammer head, tacks carried by said belt extending therethrough, said belt being mounted on rollers, and means for moving said belt, said last-mentioned means including a trigger-actuated dog and ratchet mechanism.

4. In an automatic hammer, a hollow head portion having an open end, a hammer head having guide grooves therein centrally positioned in said open end, a hollow handle communicating with said hollow head, a replaceable endless belt movably mounted in said handle and head portion and extending through said grooves over the operating face of said hammer head, tacks carried by said belt extending therethrough, said belt being mounted on rollers, means for moving said belt, said last-mentioned means including a trigger-actuated dog and ratchet mechanism, said belt having a plurality of spaced apertures therein, and gear means engaging in said apertures and movable by said ratchet to move said belt.

5. In an automatic hammer, a hollow head portion having an open end, a hammer head having guide grooves therein centrally positioned in said open end, a hollow handle communicating with said hollow head, a replaceable endless belt movably mounted in said handle and head portion and extending through said grooves over the operating face of said hammer head, tacks carried by said belt extending therethrough, said belt being mounted on rollers, means for moving said belt, said last-mentioned means including a trigger-actuated dog and ratchet mechanism, said belt having a plurality of spaced apertures therein, gear means engaging in said apertures and movable by said ratchet to move said belt, and slidable access panels in said head and handle to permit replacement of said tack-carrying belt.

HUGO. H. JOHNSON.

REFERENCES CITED

The following references are of record in the file of this patent:

UNITED STATES PATENTS

| Number | Name | Date |
| --- | --- | --- |
| 1,031,480 | Smith | July 2, 1912 |